United States Patent
Trudell et al.

(10) Patent No.: US 7,031,827 B2
(45) Date of Patent: Apr. 18, 2006

(54) COMPUTER ALGORITHM TO ESTIMATE PARTICULATE FILTER REGENERATION RATES

(75) Inventors: Dominic Trudell, Lincoln Park, MI (US); Michiel J. van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 10/412,556

(22) Filed: Apr. 11, 2003

(65) Prior Publication Data

US 2004/0204818 A1    Oct. 14, 2004

(51) Int. Cl.
    *F01N 11/00*    (2006.01)
(52) U.S. Cl. ......................... 701/114; 60/277
(58) Field of Classification Search ................ 701/114; 60/277, 295, 311
    See application file for complete search history.

(56) References Cited

U.S. PATENT DOCUMENTS

| 4,747,264 | A | * | 5/1988 | Santiago et al. .............. 60/274 |
| 6,397,587 | B1 | | 6/2002 | van Nieuwstadt et al. |
| 6,408,686 | B1 | | 6/2002 | Tallio et al. |
| 2002/0196153 | A1 | | 12/2002 | Kinugawa et al. |
| 2003/0023367 | A1 | | 1/2003 | Avery, Jr. et al. |
| 2003/0032188 | A1 | | 2/2003 | Bailey et al. |

FOREIGN PATENT DOCUMENTS

EP    1201888        5/2002
JP    60-90913 A  *  5/1985

* cited by examiner

*Primary Examiner*—Andrew M. Dolinar
(74) *Attorney, Agent, or Firm*—Allan J. Lippa; Alleman Hall McCoy Russell & Tuttle, LLP

(57) ABSTRACT

A system and method is described for determining degradation of a diesel particulate filter in an engine exhaust system. The method uses information indicative of a regeneration rate, such as regeneration duration. From this, it is possible to determine when particulate filter operation has degraded.

19 Claims, 6 Drawing Sheets

US 7,031,827 B2

COMPUTER ALGORITHM TO ESTIMATE PARTICULATE FILTER REGENERATION RATES

BACKGROUND OF THE INVENTION

Diesel engines can be equipped with diesel particulate filters (DPFs) to meet heavy duty and light duty vehicle standards DPFs are filters that catch particulate matter (also called soot) and give rise to increased backpressure as particulate matter is stored. Periodically, e.g., after several hundred miles of vehicle travel, the DPF is regenerated by raising exhaust temperature so that the soot reacts with oxygen to form CO2 and water. The soot is burned off and hence the DPF is cleaned so that it again can store particulate matter. As a result, exhaust emissions are lowered.

Methods are available for monitoring whether a DPF has degraded. One is descried in U.S. Pat. No. 2002/0196153.

The inventors herein have recognized several disadvantages with such an approach. In particular, such a method does not consider whether the released particulates have actually been burned, or whether they were released without being reacted. In other words, the catalytic materials in the DPF can degrade so that there is a lack of activity. Alternatively, there can be deficient temperature distribution across the DPF during regeneration, thereby resulting in unequal cleaning of stored particulates.

SUMMARY OF EMBODIMENTS OF THE INVENTION

The above disadvantages are overcome by a system comprising:

a computer storage medium having a computer program encoded therein for monitoring a particulate filter in a diesel engine exhaust, said computer storage medium comprising:

code for determining a parameter indicative of a regeneration rate of said particulate filter; and code for determining degradation of said particulate filter based on said parameter.

By considering the regeneration rate of the DPF, that is the rate of soot reduction during DPF regeneration, or the time it takes to go from a certain restriction level to another lower restriction level, etc., it is possible to obtain a more accurate determination of DPF activity. For example, an indication of an unusually slow regeneration rate indicates lack of activity of the catalytic material on the filter, or a deficient temperature distribution. Lack of catalytic activity may be caused by a manufacturing error by the catalyst supplier, or by sintering of the catalytic material subjected to thermal ageing. Too fast a regeneration rate can be construed as a precursor to DPF degradation.

Further, variations in the regeneration rate provide useful information for service events. If the regeneration occurs slower than expected, it may mean that the DPF, or some of the injection equipment used to regenerate the DPF, is due for replacement, even though it has not failed yet.

BRIEF DESCRIPTION OF THE DRAWINGS

The advantages described herein will be more fully understood by reading examples of an embodiments in which the invention is used to advantage, with reference to the drawings, wherein.

DESCRIPTION OF EMBODIMENT(S)

Figure 1A:
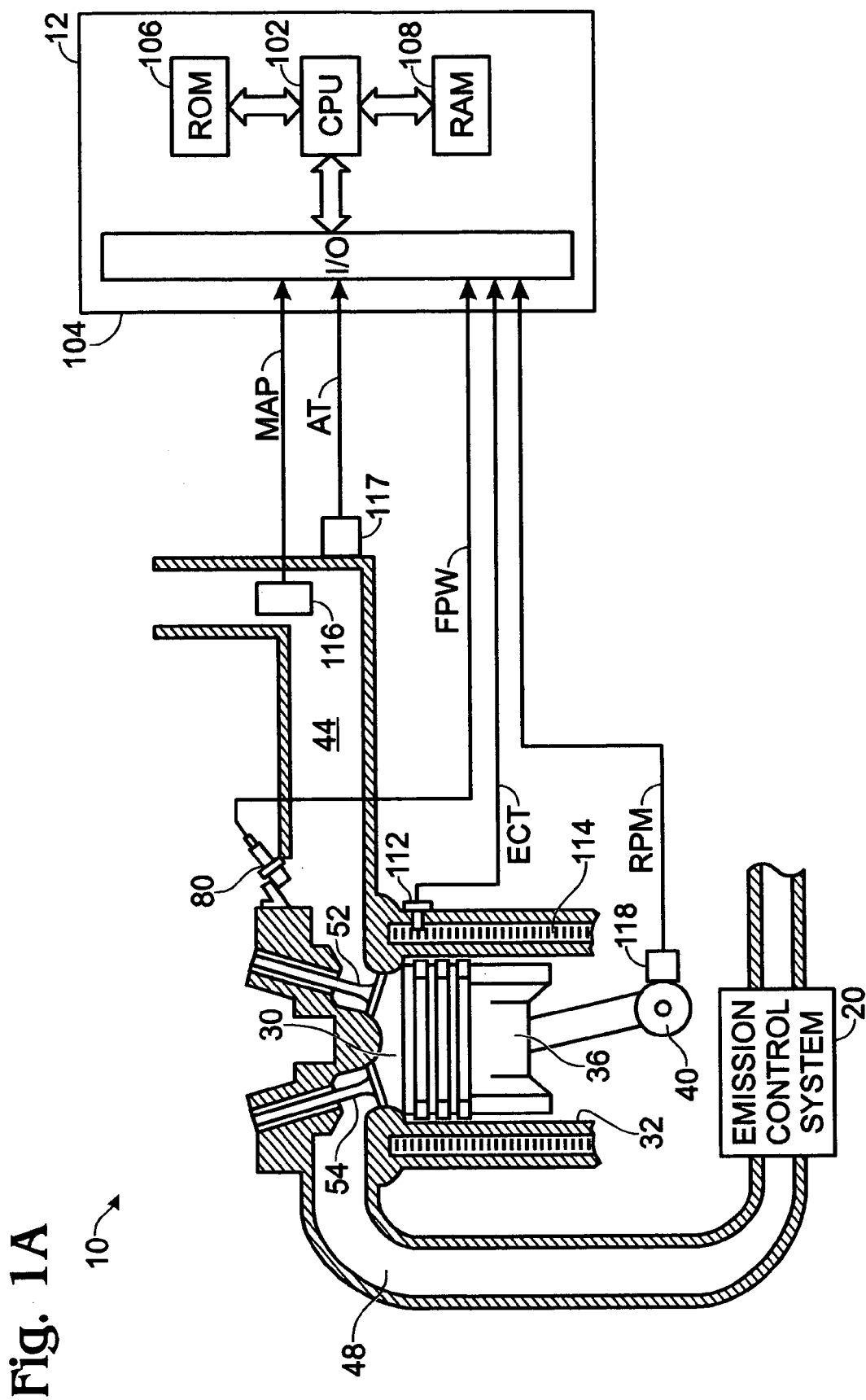
FIGS. 1A and 1B are schematic diagrams of an engine wherein the invention is used to advantage.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown), including a fuel tank, fuel pump, and fuel rail. Compression ignition combustion is primarily utilized in engine 10.

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

An emission control system 20 is coupled to an exhaust manifold 48 and several exemplary embodiments of the system in accordance with the present invention are described with particular reference to FIGS. 2A–2C.

Figure 1B:
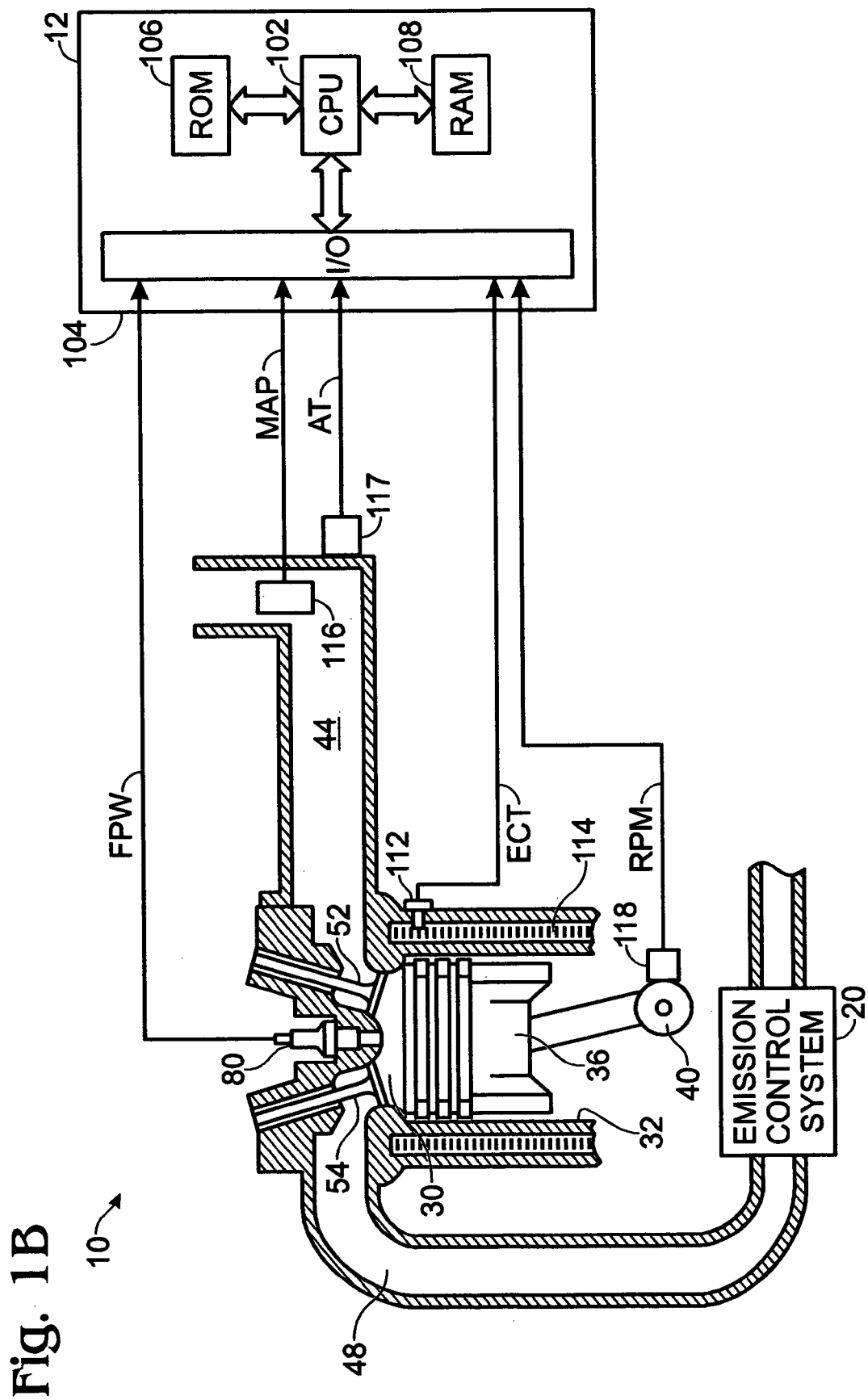

Referring now to FIG. 1B, an alternative embodiment is shown where engine 10 is a direct injection engine with injector 80 located to inject fuel directly into cylinder 30. Fuel is delivered to fuel injector 80 by a fuel system (not shown), including a fuel tank, fuel pump, and high pressure common rail system.

In one example, engine 10 is a diesel fueled engine that operates with stratified charge combustion in excess oxygen conditions. Alternatively, fuel timing adjustments, and multiple fuel injections, can be utilized to obtain homogeneous charge compression ignition combustion While lean operation it utilized, it is also possible to adjust engine conditions to obtain stoichiometric or rich air-fuel ratio operation.

In another alternative embodiment, a turbocharger can be coupled to engine 10 via the intake and exhaust manifolds.

Figure 2:
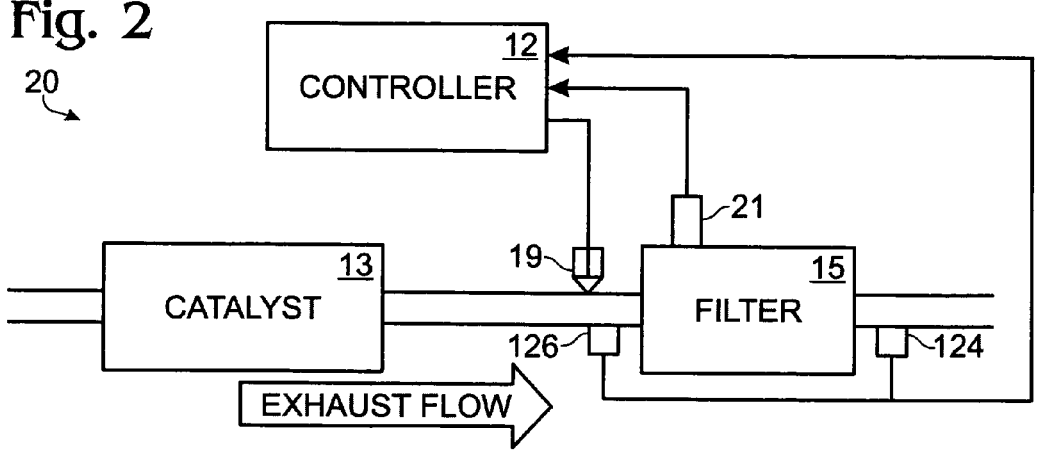
FIG. 2 is a schematic diagram of exemplary emission control system in accordance with the present invention.

Referring now to FIG. 2, the emission control system 20 optionally includes a catalyst 13 upstream of the particulate filter 15. Various types of catalysts can be optionally used, such as, for example: a urea based Selective Catalytic Reduction (SCR) catalyst, or oxidation catalyst, or a NOx absorber, or these catalysts could be combined with the particulate filter. In the case of an SCR catalyst, in one example, it is a base metal/zeolite formulation with optimum NOx conversion performance in the range of 200–500° C. Reductant, such as aqueous urea, can be stored on-board and injected in the exhaust system upstream of the SCR catalyst. Alternatively, any other structure known to those skilled in the art to deliver reductant to an exhaust gas aftertreatment device may be used, such as late injection in a direction injection type engine.

Alternatively, catalyst 13 includes (separate or in addition to the SCR catalyst) an oxidation catalyst, which is a precious metal catalyst, preferably one containing platinum, for rapid conversion of hydrocarbons (HC), carbon monoxide (CO) and nitric oxide (NO) in the engine exhaust gas. The oxidation catalyst is also used to supply heat in the exhaust system, wherein an exotherm is created when extra HC is reduced over the oxidation catalyst. This can be accomplished through, for example, in-cylinder injection during either or both of a power or exhaust stroke of the engine (in a direct injection engine) or any of a number of other alternatives, such as retarding injection timing, increasing EGR and intake throttling, or any other means known to those skilled in the art to increase the HC concentration in the exhaust gas. Alternatively, hydrocarbons may be injected directly into the exhaust gas stream entering the oxidation catalyst employing any means known to those skilled in the art. Reductant delivery system 19 may be used to deliver HC from the fuel tank or from a storage vessel to the exhaust system to generate heat for heating the particulate filter 15 for regeneration purposes, as described below.

Particulate filter (15), in one example a diesel particulate filter (DPF), is coupled downstream of the catalyst and is used to trap particulate matter (soot) generated during the drive cycle of the vehicle. The DPF can be manufactured from a variety of materials including cordierite, silicon carbide, and other high temperature oxide ceramics. Once soot accumulation has reached a predetermined level, regeneration of the filter can be initiated as described below herein. Filter regeneration is accomplished by heating the filter to a temperature that will burn soot particles at a faster rate than the deposition of new soot particles, for example, 400–600° C. The inventors have recognized that using increased engine exhaust gas production to increase the particulate filter temperature to regeneration temperature may result in thermal damage to the upstream catalyst in the system configuration of the present invention. Accordingly, the inventors recognized that, in an alternative embodiment, the filter could be regenerated by extra hydrocarbon injection downstream of the catalyst. In one approach, reductant delivery system (19) is coupled to the exhaust gas manifold between the catalyst and the particulate filter to supply a vaporized mixture of hydrocarbon (e.g., diesel fuel or some other reductant) and air to the particulate filter thereby achieving regeneration temperatures. In one example, the DPF can be a catalyzed particulate filter containing a washcoat of precious metal, such as Platinum, to lower soot combustion temperature and also to oxidize hydrocarbons and carbon monoxide to carbon dioxide and water.

Generally, controller 12 controls the amount and timing of HC injection in accordance with engine operating parameters such as the amount of exhaust gas NOx, exhaust gas temperature, catalyst temperature, and various other parameters. Specifically, when particulate filter regeration is requested, controller 12 controls the amount and timing of HC injection upstream of the particulate filter in order to raise the filter temperature to a desired regeneration temperature.

In an alternative embodiment, the exhaust system can include only particulate filter. In this case, air assisted diesel fuel injection (or another suitable reductant) upstream of the DPF can be utilized via device 19.

Further note that additional temperature sensor 21 is shown coupled to the DPF. The sensor could also be located upstream or downstream of the filter, or DPF temperature (or exhaust temperature) can be estimated based on operating conditions using an exhaust temperature model. Further, multiple temperature sensors can be used, e.g. one upstream and one downstream of the DPF.

Also, a differential pressure signal ($\Delta p$) is shown being determined from pressure sensors 124 and 126. Note that a single differential pressure can also be used to measure the differential pressure across DPF 15.

In yet another alternative embodiment, the DPF can be located in an upstream location, with an optional catalyst (or catalysts) located downstream.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 3:
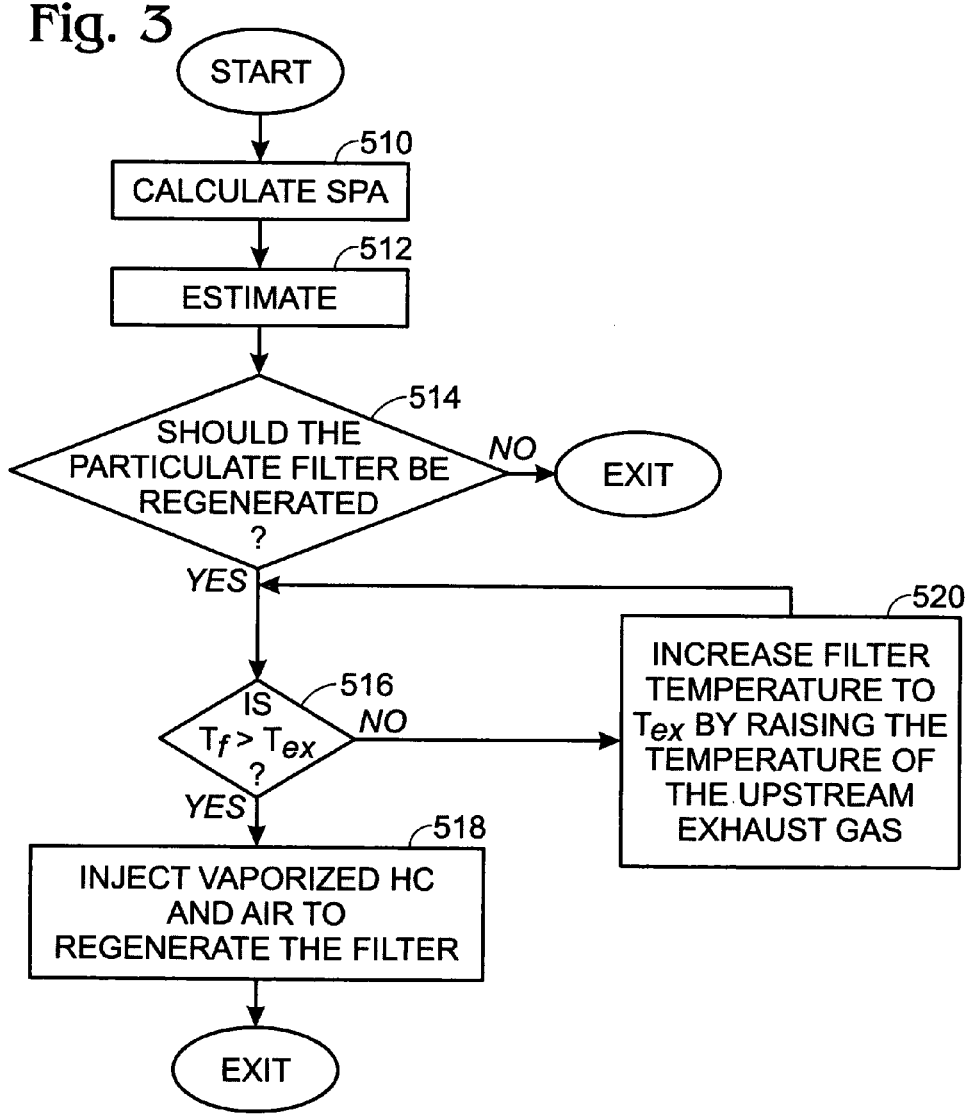
FIG. 3 is an exemplary routine for the particulate filter regeneration in accordance with the present invention.

Referring now to FIG. 3, an example of a method for regenerating a particular filter is presented that can be used in place of, or in addition to, particulate filter regeneration based on a differential pressure measured across the filter (wherein filter regeneration is requested when measured differential pressure reaches a threshold value, with the threshold value determined based on current operating conditions such as engine speed and load).

First, in step 510, the total particulate amount, spa, stored in the particulate filter is determined. In a preferred embodiment, this amount is constantly updated and is based on the current stored particulate amount and the incremental amount of particulates generated per predetermined sampling time during the combustion process, which is determined based on engine operating conditions such as fuel injection amount and engine speed. Next, the routine proceeds to step 512, wherein the particulate filter temperature, $T_f$, is estimated or determined based on sensor 21. In a one embodiment, this temperature is estimated based on engine operating conditions using characteristic predetermined maps stored in memory. The engine operating parameters comprise engine speed, fuel injection amount, fuel injection timing, and engine temperature. Any other method known to those skilled in the art for estimating a temperature of an emission control device may be used to advantage with the present invention.

Next, in step 514, a determination is made whether the particular filter should be regenerated. In particular, if the stored particulate amount (spa) is greater than the maximum limit amount S2, or the particulate filter temperature, $T_f$, is greater than the temperature limit T1 and spa is greater than the limit amount S1, regeneration is indicated. Thus, the present invention takes advantage of higher particulate filter temperatures that may be encountered during certain driving conditions by purging stored particulates at that time even if the total spa is below the maximum limit amount S2. Thus, fuel economy is improved by opportunistically regenerating the particulate filter due to the smaller amounts of energy required to increase filter temperature to the regeneration temperature. If the answer to step 514 is NO, the routine exits. If the answer to step 514 is YES, i.e., particulate filter regeneration is indicated, the routine proceeds to step 516 wherein a determination is made whether $T_f$ is greater than $T_{ex}$, which is the temperature above which hydrocarbons will react exothermically with oxygen in the exhaust gas. If the answer to step 516 is YES, the routine proceeds to step 518 wherein a vaporized mixture of hydrocarbon and air is injected into the exhaust gas entering the particulate filter via the reductant delivery system. Alternatively, any other structure known to those skilled in the art, and suggested by this disclosure, to supply reductant to an exhaust gas aftertreatment device may be used. The resulting exotherm then causes the temperature of the particulate filter to increase to the regeneration temperature. The rate of hydrocarbon injection, and the length of injection time required to complete filter regeneration is preferably determined based on operating conditions such as the spa, filter temperature, engine speed, fuel injection amounts, differential pressure etc. Once filter regeneration is completed, the routine exits. If the answer to step 516 is NO, the routine proceeds to step 518, wherein the particulate filter temperature is increased above $T_{ex}$ by raising the temperature of the exhaust gas upstream of the particulate filter such as, for example, by creating an exothermic reaction in the oxidation catalyst 13 through extra hydrocarbon injection, or by engine related measures, such as retardation of injection timing, increasing EGR, or closing an intake throttle. The routine then cycles though step 516 until $T_{ex}$ is reached.

Thus, it is possible to regenerate the particulate filter by first adjusting the temperature of the upstream exhaust gas to raise the temperature of the particulate filter to a temperature above which hydrocarbon will react exothermically with oxygen in the exhaust gas, and then by achieving regeneration temperatures through extra hydrocarbon injection into the filter.

Degradation Detection of DPF

Before describing the details of DPF monitoring, the details of filter regeneration are first described. Several publications have proposed an expression for regeneration rate based on an Arrhenius equation, as shown below in Equation (1):

$$\frac{dM}{dt} = -M \cdot C(O_2) e^{-E/(RT)} \quad (1)$$

Assuming that the oxygen concentration C(O2) is high enough, the reaction reduces to order zero in oxygen. Further assuming that the soot mass M is linear in the restriction R, and that the temperature can be approximated by its average ($T_{av}$) over a regeneration, this equation can be integrated over a regeneration to obtain equation (4).

$$\frac{M_f}{M_0} = e^{-E(t_f - t_0)/(RT_{av})} \quad (4)$$

or, as rearranged, equation (5).

$$RR := \frac{\ln \frac{M_0}{M_f}}{(t_f - t_0)} = -E/(RT_{av}) \quad (5)$$

where t stands for time, T stands for temperature, the subscript 0 stands for conditions at the beginning of regeneration and the subscript f stands for conditions at the end of regeneration.

To determine the start of regeneration, it is possible to use the time at which the pre-DPF temperature achieves a maximum, or, alternatively, the first time this temperature exceeds a calibratable limit at which it can reasonably be expected that regeneration has been initiated. Still another approach can determine start of regeneration after a threshold number of exhaust fuel injections, or an amount of exhaust fuel injections (being indicative of an amount of heat generated in the exhaust).

To determine the end of regeneration, it is possible to use the time at which the post DPF temperature (e.g., downstream temperature) achieves a maximum. These temperatures can be measured using any number of temperature sensors in the exhaust of the engine. There are, of course, alternative methods for determining the starting and ending of regeneration. For example, the end of regeneration can be found when the flow resistance of the DPF has fallen below a certain level (as measured by exhaust backpressure, or differential pressure across the DPF, for example). Thus, by determining when regeneration starts and ends, it is possible to determine regeneration rate and thereby accurately determine degradation of the DPF. Such methods are described in more detail below with regard to FIG. 4.

Figure 4:
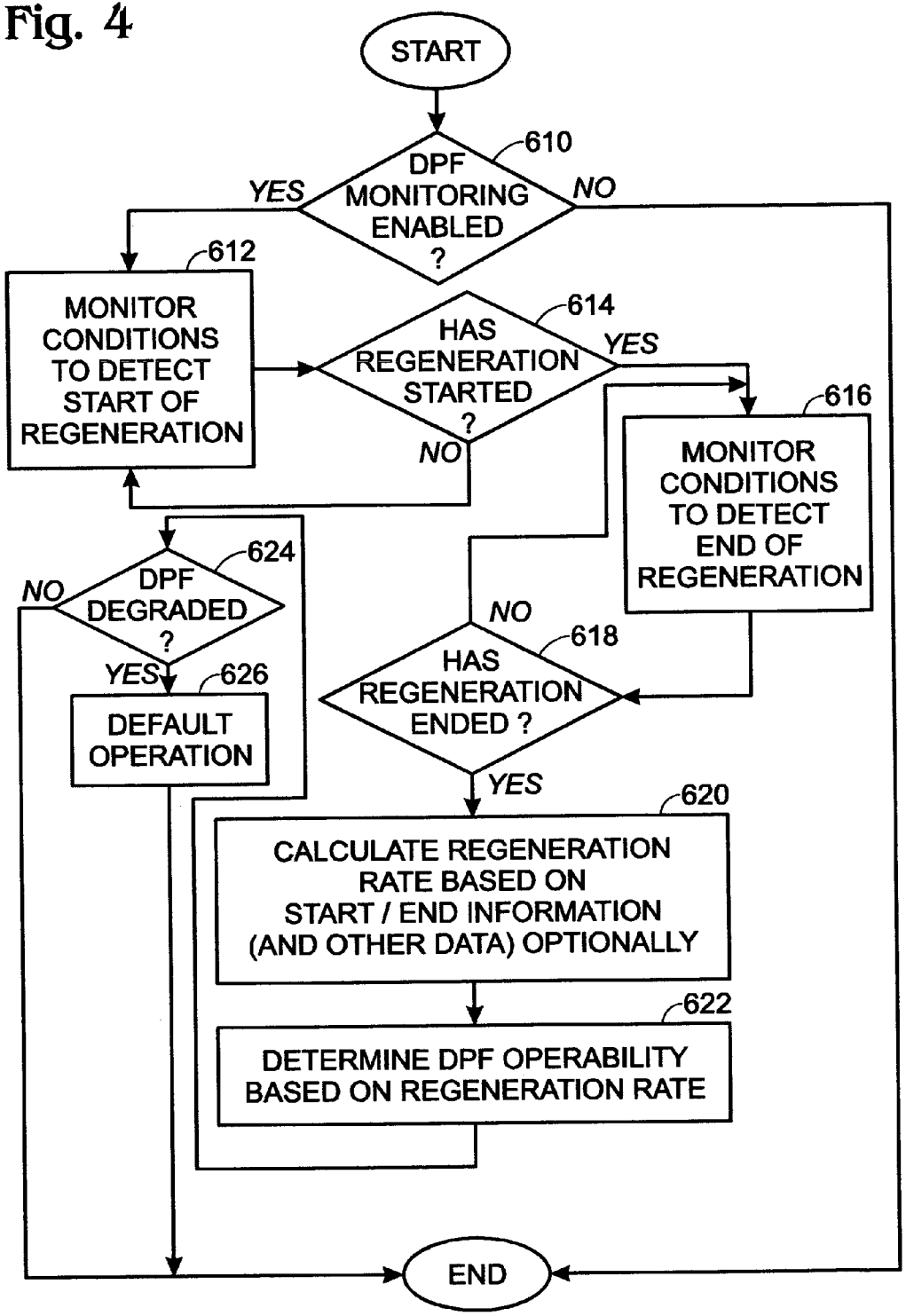
FIG. 4 is an exemplary routine for particulate filter monitoring.
Figure 5A:
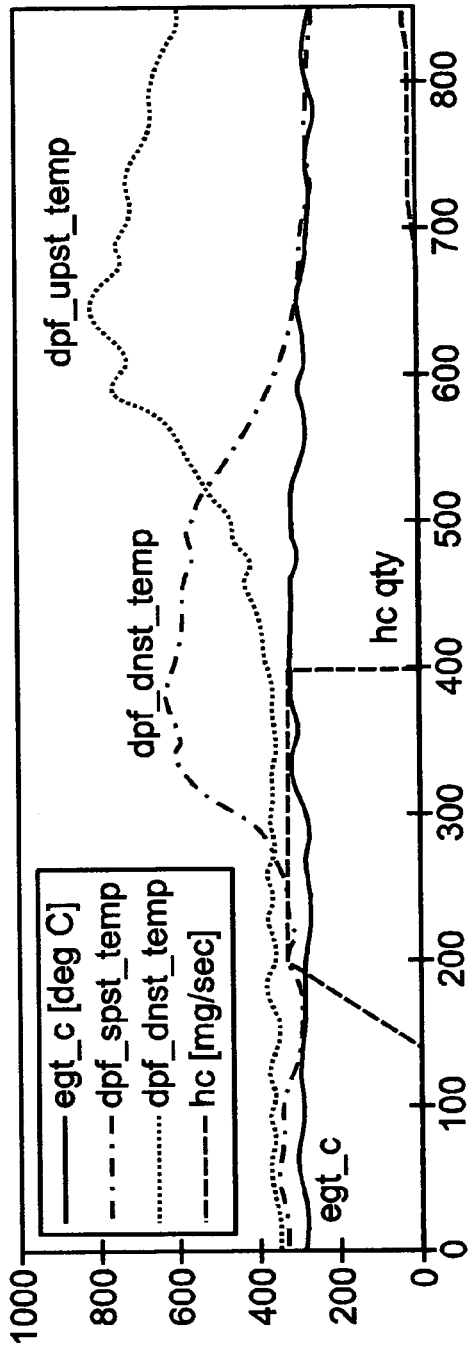
FIGS. 5–6 are graphs illustrating experimental test data.
Figure 5B:
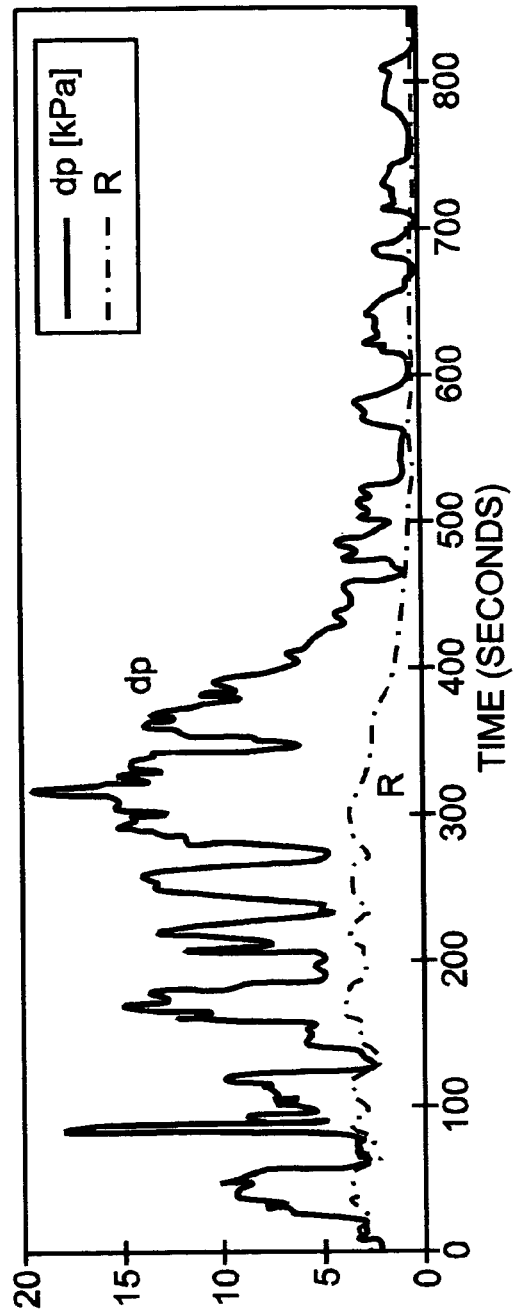
Figure 6:
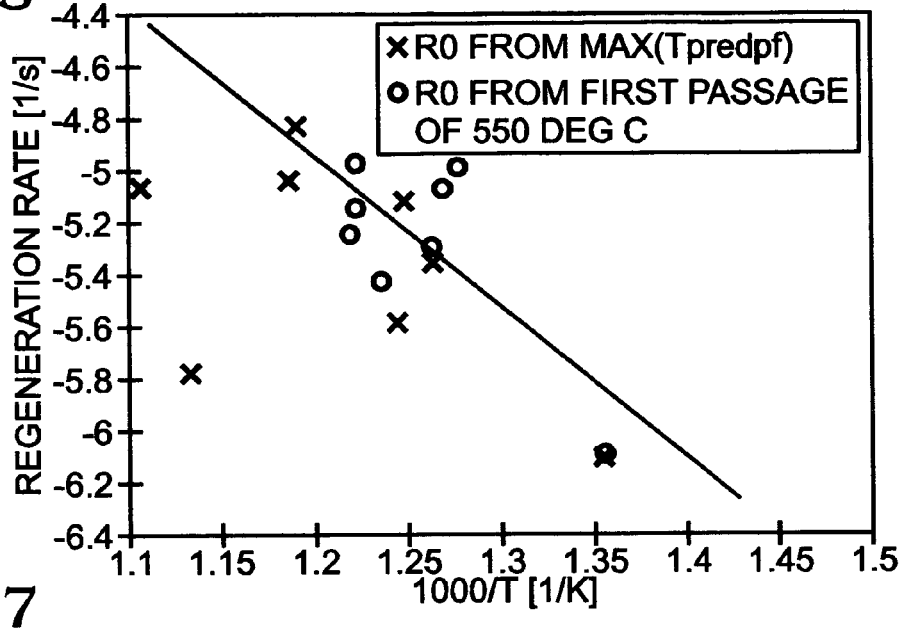

FIG. 5 shows that these methods for determining starting and ending of are reasonable choices for the start and end of regeneration. FIG. 6 plots log(RR) versus 1000/Tav for different choices of start of regeneration (pre-DPF temperature (x), and first passage of 550 Deg. C. (o)), together with a linear regression. There is some spread in the results, but this metric still can provide useful information on the regeneration rate. If the metric RR falls outside a band around the nominal value as a function of $1/T_{av}$, a diagnostics flag can be set as shown in the diagnostic routine of FIG. 4, below. Possible causes of this condition are a high ash load or a thermal leakage path (corrupted insulation).

Referring now to FIG. 4, a diagnostic routine is described for determining degradation of the DPF based on regeneration rate, and taking appropriate action.

First, in step 610, the routine determines whether monitoring of the DPF has been enabled based on various operating conditions. For example, DPF monitoring is generally not enabled during engine starting conditions, during low ambient temperatures, and during various other conditions. When the answer to 610 is "yes", the routine continues to step 612 to monitor operating conditions indicating a start of DPF regeneration. As described above, there are various conditions that can be used to determine whether DPF regeneration has begun. Any of these methods, or combinations thereof, can be used in step 612. Next, in step 614 the routine determines whether the regeneration has started based on the monitored conditions of step 612. When the answer to step 614 is "no", the routine continues to monitor whether a DPF regeneration has begun.

When the answer to step 614 is "yes", the routine continues to step 616 to monitor conditions indicating the end of particulate filter regeneration. Again, as described above herein, there are various methods for determining the end of particulate filter regeneration and any of these methods, or combinations thereof, can be used. Further, the routine uses a counter to measure the duration of particulate filter regeneration that is incremented in step 616. This counter can be in terms of elapsed time, elapsed distance, elapsed number of engine cycles, or any other such counting metric. From step 616, the routine continues to step 618 and determines whether the regeneration has ended based on the information gained in step 616. When the answer to step 618 is "no", the routine returns to step 616 and continues to monitor conditions in increments the counter. Otherwise, when the answer to step 618 is "yes", the routine continues to step 620.

In step 620, the routine calculates the regeneration rate based on the starting and ending information obtained in steps 612 and 616, as well as other information that can optionally be used to provide a more accurate determination. Specifically, in one example, the routine uses equation 5 to calculate a regeneration rate. In an alternative example, the routine simply uses the elapsed time of the regeneration cycle as a parameter indicative of the regeneration rate. Still another approach to obtain a parameter indicative of the regeneration rate is to utilize the time it takes for the restriction level in the particulate filter to change from a first restriction level to a second restriction level.

In one example, the restriction level can be determined as now described by utilizing a differential pressure measured across the DPF.

Restriction Equations:

Generally, the pressure drop ($\Delta p$) across the DPF is affected by the volumetric flow (F) and the soot loading of the DPF, as well as other factors (which can be included if desired). The pressure drop consists of contraction and expansion losses, frictional losses of the flow along the walls, and pressure losses due to the flow through a porous medium. For a clean DPF, the relation between pressure drop and flow can be approximated by the Darcy-Forchheimer equation (6):

$$\Delta p = c_0 + c_1 v \cdot F + c_2 \rho \cdot F^2 \qquad (6)$$

The soot load in the DPF has an effect mostly on the linear term in this equation (see A. G. Konstandopoulos, E. Skaperdas, M. Masoudi, "Inertial contributions to the pressure drop of diesel particulate filters", SAE 2001-01-0909; and A. G. Konstandopoulos, M. Kostoglou, E. Skaperdas, E. Papaioannou, D. Zarvalis, E. Kladopoulou, "Fundamental studies of diesel particulate filters: transient loading, regeneration and aging", SAE 2000-01-1016). Utilizing this information, it is possible to form the following relationship of equation (7):

$$\Delta p = R(soot)(c_0 + c_1 v \cdot F) + c_2 \rho \cdot F^2 =: g(soot, F) \qquad (7)$$

where, F is volumetric flow, $\rho$ is density, and $v$ is viscosity).

The coefficients $c_i$ can be obtained from experimental flow testing of the DPF. Further, the density and viscosity of exhaust gas can be estimated based on exhaust gas temperature and experimental test data. The restriction R(soot) is a monotonic function of the soot load in grams/liter. In one example, regeneration can be determined to be ending when the restriction falls below a threshold level. In another example, the regeneration rate can be correlated to the time it takes for the restriction level to fall from a first level to a second level.

Continuing with FIG. 4, in step 622, the routine determines the DPF operability based on the calculated parameter, or parameters, indicative of the regeneration rate. As described above, this can include calculating the regeneration rate itself, or utilizing a regeneration time, or using any of the other information described above that is indicative of the regeneration rate. In one specific example, the regeneration rate is compared to a threshold rate in step 624 to determine if the DPF has degraded. When the answer to step 624 is "yes", the routine continues to step 626 to implement default operation. Otherwise, the routine ends.

Note that various forms of default operation can be used, such as discontinuing regeneration cycles, inform operator via indicator light/lamp/LED, or limiting engine speed and load operation. Alternatively, default operation can include adjusting the conditions under which regeneration is requested. For example, regeneration may be conducted at higher temperatures in an effort to recover effective particulate filter regeneration whereby stored soot is converted more effectively due to better temperature distribution.

Figure 7:
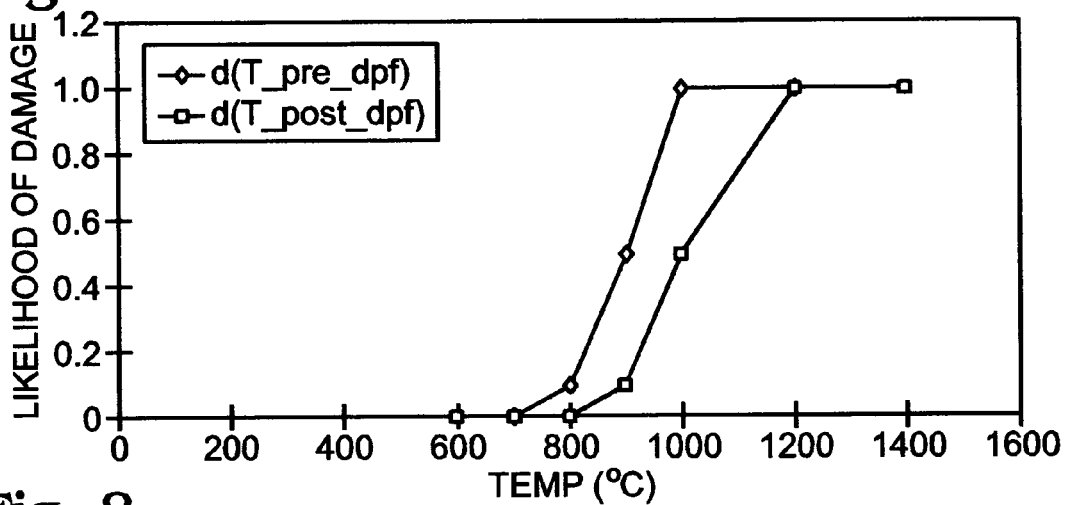
FIGS. 7–8 are graphs illustrating utilizing temperature values to detect DPF regeneration rates.
Figure 8:
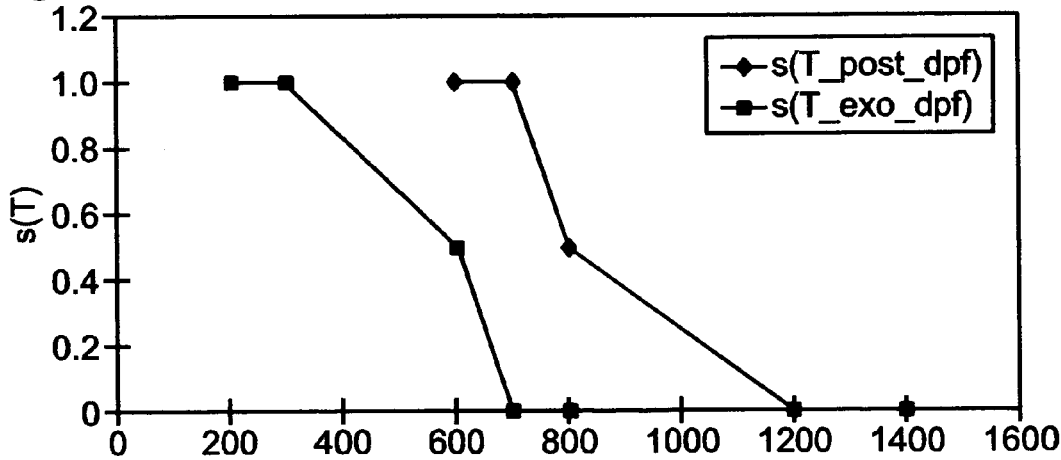

Referring now to FIGS. 7–8, yet another alternative approach is described for determining regeneration rate of the DPF. Such an approach can be used alone, or can be used in addition to the approaches described above to obtain a more accurate indication of DPF regeneration rate. Thus, as described below, temperature indicators can be used to predict the likelihood of DPF degradation during regeneration, and compromised ability to regenerate. The following temperature signals contain information on the likelihood of degradation:

T_pre_dpf (temperature upstream of the DPF)
T_post_dpf (temperature downstream of the DPF)
T_exo_dpf=T_post_dpf− T_pre_dpf (indicative of a temperature rise due to exothermic reaction across the DPF)
and the respective rates of these temperatures: d(T_pre_dpf)/dt, d(T_post_dpf)/dt, and d(T_exo_dpf)/dt.

In one example, if any of these 6 signals is high, it indicates a likelihood that the DPF is degraded. To process this information a "degradation likelihood" function d(.) of the signals is used. This function is an indicator function which is 0 at low values of the input argument and 1 at high values of the input argument. Such a function is displayed in FIG. 7.

A sum of the indicators is then used to come to a total assessment of the likelihood of degradation:

$$D = d1(T\_pre\_dpf) + d2(T\_post\_dpf) + d3(T\_exo\_dpf) + d4(d(T\_pre\_dpf)/dt) + d5(d(T\_post\_dpf)/dt) + d6(d(T\_exo\_dpf)/dt)$$

D takes values between 0 and 6 and is a measure of the likelihood of degradation. If D is higher than a certain calibratable limit, an indication that DPF degradation has occurred is provided, and default operation can be used. Further, this information can passed on to an OBD (on-board diagnostic) executive.

Conversely, unexpectedly low values of T_pre_dpf, T_post_dpf, T_exo_dpf, and their rates can indicate that the regeneration is occurring slower than expected and can be used as an indicator that catalytic activity has gone down or thermal insulation is below specification. To that end, indicator functions s(.) that are 1 for low values of their argument and 0 for high values, such as displayed in FIG. 8, can be used.

The sum of the indicators is then used to come to a total assessment of the likelihood of abnormally slow regeneration:

$$S = s1(T\_pre\_dpf) + s2(T\_post\_dpf) + s3(T\_exo\_dpf) + s4(d(T\_pre\_dpf)/dt) + s5(d(T\_post\_dpf)/dt) + s6(d(T\_exo\_dpf)/dt)$$

S takes values between 0 and 6 and is a measure of the likelihood of degradation to catalytic activity or thermal insulation. If S is higher than a certain calibratable limit an indication that degradation is likely is provided, and default operation can be commenced. Again, this information can be passed on to an OBD executive.

This concludes the description of the invention. The reading of it by those skilled in the art would bring to mind many alterations and modifications without departing from the spirit and the scope of the invention. Accordingly, it is intended that the scope of the invention be defined by the following claims:

We claim:

1. A system comprising:
   an emission control system in a diesel engine's exhaust, the emission control system having at least a catalyst and a particulate filter; and
   a computer storage medium having a computer program encoded therein for monitoring said particulate filter in the diesel engine exhaust, said computer storage medium comprising:
   code for determining a first parameter indicative of a regeneration rate of said particulate filter;
   code for determining an expected reference band that is a function of an operating parameter; and
   code for determining degradation of said particulate filter based on whether said first parameter falls outside the expected reference band.

2. The system of claim 1 wherein said first parameter is an amount of time it takes to regenerate the particulate filter.

3. The system of claim 1 wherein said first parameter is a calculated regeneration rate based on exhaust gas temperature.

4. A system comprising:
   a computer storage medium having a computer program encoded therein for monitoring a particulate filter in a diesel engine exhaust, said computer storage medium comprising:
   code for determining a parameter indicative of a regeneration rate of said particulate filter; and
   code for determining degradation of said particulate filter based on said parameter, wherein said parameter is calculated based on a weighted sum of a plurality of exhaust gas temperatures, and a plurality of rates of change of exhaust gas temperatures.

5. The system of claim 1 wherein said first parameter is a calculated regeneration rate based on a change in particulate filter flow restriction.

6. The system of claim 1 further comprising a temperature sensor in said exhaust providing a signal utilized by said computer storage medium, wherein said operating parameter includes a temperature measured by said temperature sensor, and said reference band depends on said temperature.

7. The system of claim 6 wherein said temperature sensor is coupled upstream of the particulate filter.

8. The system of claim 6 wherein said temperature sensor is coupled downstream of the particulate filter.

9. The system of claim 6 wherein said temperature sensor is coupled in the particulate filter.

10. The system of claim 1 wherein said computer storage medium further comprises code for discontinuing DPF regeneration in response to said determined degradation.

11. A system comprising:
    a computer storage medium having a computer program encoded therein for monitoring a particulate filter in a diesel engine exhaust, said computer storage medium comprising:
    code for determining a start point of a regeneration of said particulate filter;
    code for determining an end point of said regeneration of said particulate filter;
    code for determining an exhaust temperature during said regeneration and an amount of particulate stored at said start point; and
    code for determining degradation of said particulate filter based on said determined start and end point, taking into account said temperature, and said amount of stored particulate.

12. The system of claim 11 wherein said start point is a start time of a regeneration of said particulate filter.

13. The system of claim 11 wherein said end point further is an end time of said regeneration of said particulate filter.

14. The system of claim 11 wherein said start point is when temperature upstream of the particulate filter achieves a maximum value.

15. The system of claim 11 wherein said start point is when temperature upstream of the particulate filter exceeds a threshold value.

16. The system of claim 11 wherein said end point is when a flow restriction of the particulate filter reaches a threshold level.

17. The system of claim 11 wherein said end point is when temperature downstream of the particulate filter achieves a maximum value.

18. A method for monitoring a particulate filter in a diesel engine exhaust, the exhaust also having at least a catalyst, the method comprising:
    monitoring a regeneration rate of said particulate filter; and
    determining degradation of said particulate filter when said regeneration rate falls outside a reference band, where said determination takes into account exhaust temperature during said regeneration to thereby account for variation in regeneration rate as a result of said temperature, where said variation accounts for a relatively slower expected regeneration rate during at least a lower temperature, and a relatively faster expected regeneration rate during at least a higher temperature.

19. The method of claim 18, wherein the reference band is based on said exhaust temperature.

* * * * *